Sept. 18, 1928. 1,684,528
J. M. BARTLEY
APPARATUS FOR SUPPLYING FUEL TO INTERNAL COMBUSTION ENGINES
Filed June 29, 1922
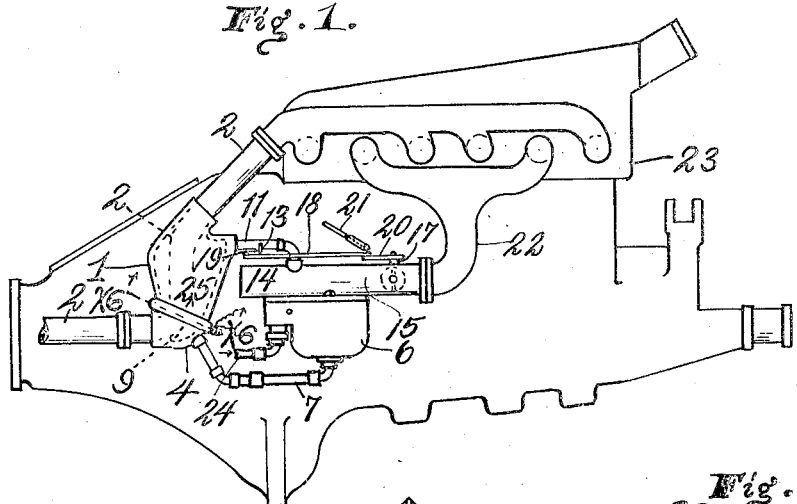
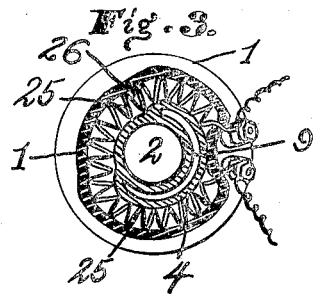
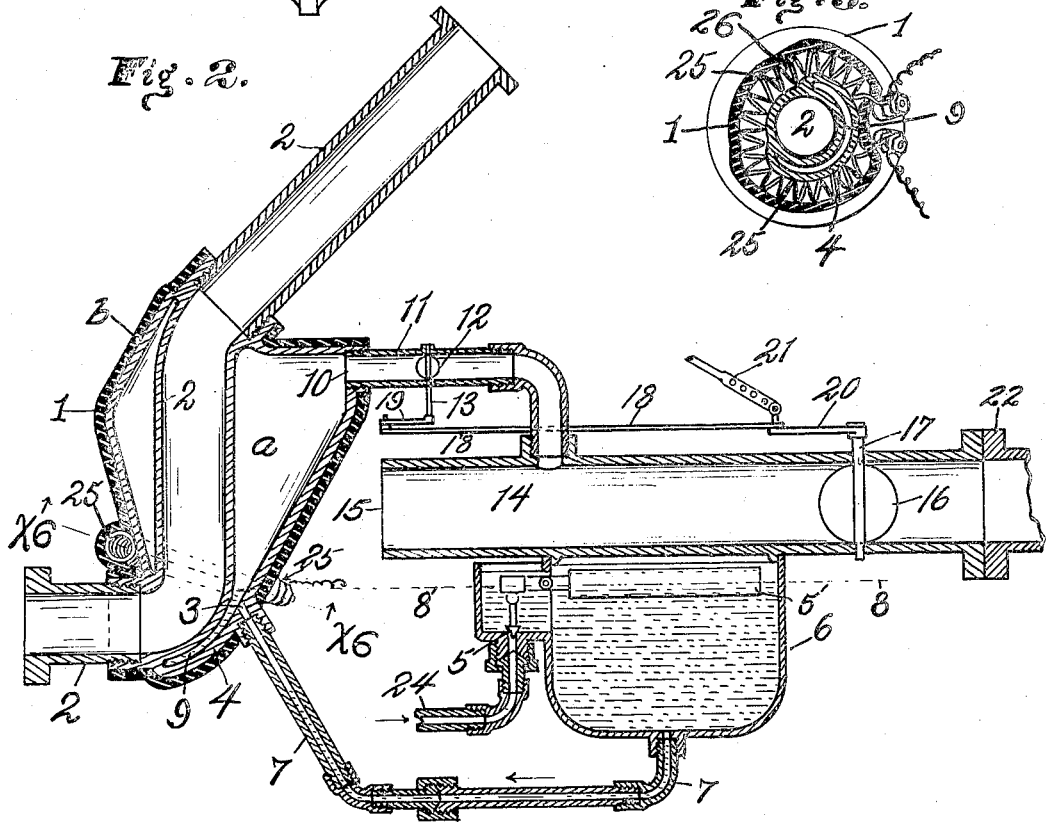
Inventor.
John Miles Bartley.
James R. Townsend
his atty.
Witness:
W. M. Coutts Patented Sept. 18, 1928.

1,684,528

UNITED STATES PATENT OFFICE.

JOHN MILES BARTLEY, OF LONG BEACH, CALIFORNIA, ASSIGNOR TO GENERAL COMBUSTION COMPANY, OF LONG BEACH, CALIFORNIA, A CORPORATION OF CALIFORNIA.

APPARATUS FOR SUPPLYING FUEL TO INTERNAL-COMBUSTION ENGINES.

Application filed June 29, 1922. Serial No. 571,721.

This discovery will be herein described as exemplified in the production of gaseous fuel from gasoline and atmospheric air, and is broadly new, basic and pioneer in that I add to cold atmospheric air, gaseous products of the hydrocarbon delivered by the pressure of its own expansion in the process of gasification and deliver the practically cold product resulting from the mixture of such expanded gaseous fuel with the cold air and the invention includes a cold air pipe having a free inlet for atmospheric air; a retort insulated from said air inlet; means to supply to the retort the liquid hydrocarbon; and means leading from the retort and opening into the cold air pipe; the liquid fuel being supplied under low pressure controlled by a float valve.

I have discovered that by highly heating liquid fuel in a retort and thereby driving off highly heated vapors from such fuel and then mixing said vapors with cold air and immediately introducing the mixture to the cylinders of an internal combustion engine, the efficiency of the engine and the economy of fuel is greatly increased and that the likelihood of carbonizing the cylinders of the engine is minimized and furthermore that the lubricating oil in the crank case does not deteriorate so rapidly as is usual with the common practice of supplying the cylinders with atomized fuel from the carbureter.

This invention comprises a device adapted to supply internal combustion engines with a combustible mixture made from atmospheric air and liquid hydrocarbon.

An object of this invention is to increase the efficiency of internal combustion engines and increase economy of fuel by simple automatic means that requires no attention, and in which the liability of getting out of order is reduced to a minimum.

A principle of this invention is the production of a well-balanced stable mixture of cold air and hot vapors from liquid hydrocarbons such as gasoline and the like; and a further principle of the invention is that the mixture is applied to the engine cylinders at a comparatively low temperature, thus to take advantage of a wide range of expansion of the air in the engine cylinder under the heat produced by the combustion of the mixture in such cylinder.

I have discovered that by heating liquid fuel such as gasoline and the like, and thereby producing hot vapors of the fuel without any combustion and then mixing cold atmospheric air with the hot vapors, and then introducing the mixture to the place of combustion, combustion of said vapors will liberate power more effectively than by any method heretofore known to me, and that when such mixture is combusted in the cylinders of a gas engine, greater efficiency of the fuel is effected.

This invention is adapted to be used on multiple cylinder vehicle engines and mixes the vapor of gasoline and like liquid fuel in a heated state with cold air before entering the cylinders.

A broadly new, basic and pioneer feature of the invention is that the only heat applied to the cold air before it enters the cylinders is that contained in the heated vapor.

Purposes of the invention are:
(1) to increase the efficiency of the engine; (2) to eliminate the deposition of carbon on the walls of the cylinders and piston heads; (3) to keep the engine cooler; (4) to make it possible to start the engine readily; (5) to make a multiple cylinder engine function with a more even power stream; (6) to make the engine function equally as well at low speed as at high speed; (7) to do away with the intricate and delicate adjustment of a carbureter; (8) to automatically maintain a proper mixture under varying loads, speeds, altitudes, and atmospheric conditions; (9) to make it possible to use a low grade fuel without injury to the engine.

Other objects, advantages and features of invention may appear from the accompanying drawings, the subjoined detail description and the appended claims.

The accompanying drawings illustrate the invention.

Fig. 1 is a side elevation of a preferred form of my invention applied to a multi-cylinder internal combustion engine.

Fig. 2 is an enlarged vertical section of the device shown in Fig. 1 and detached from the engine.

Fig. 3 is a transverse section on line indicated at $x^6$—$x^6$, Figs. 1 and 2.

The jacket 1 in this instance surrounds an exhaust or heated pipe 2, and the combustible liquid for making fuel vapor for the engine is introduced through a port 3 at the lower end 4 of said jacket, and its introduction is limited by the usual float valve 5 controlled by the float 5' in float bowl 6, which is connected by the channel 7 with said port 3 that is near the liquid level 8 of the float bowl.

The jacket 1 forms a fuel expansion chamber, the lower portion 9 of which is thin, the lower end 4 of the jacket being at that point close to the exhaust pipe 2; and said jacket is expanded upwardly so that the fuel expansion chamber $a$ is of considerable cross-section at the upper portion; and at the top of said chamber the vapor outlet port 10 is provided and is connected with the valved vapor passage 11 having a suitable valve 12 operable by valve-stem 13. Said vapor passage 11 opens into the mixing chamber 14 which has an air inlet 15 and a valve 16 controlled by valve stem 17 which is connected by connecting rod 18 with the valve stem 13; said valve stems 13 and 17 being provided with crank arms 19 and 20 of equal radius.

21 is the operating rod which may be connected to be operated by the driver in any well known mechanical way.

The mixing chamber 14 is connected to the supply manifold 22 of the engine 23, and the air and vapor flow thereinto, under force of the suction of the engine, and the expansion of the vapor as the same is heated by the exhaust.

The float bowl 6 is supplied with liquid fuel, as gasoline, through the usual supply pipe 24.

The valves 12 and 16 may be of any suitable character and are shown as butterfly throttle valves and the control of the vapor arising from the heated chamber within the jacket is effected thereby.

The valved pipes and the jacket are preferably circular in cross-section as indicated in Fig. 3, but may be of different shapes.

The purpose of the jacket 1 is to heat and thus vaporize the fuel introduced at 3, utilizing for this purpose the heat from the exhaust pipe 2; and a preliminary heating is provided for by suitable means as an electrical resistance 25 inserted in the chamber 26 at the reduced lower portion of the upwardly expanding chamber $a$ inside the jacket 1.

In Fig. 2 the vapor inlet 11 is shown opening into the air intake and is of reduced diameter as compared with the air intake 15.

In practical operation, the liquid fuel in the chamber $a$ is vaporized by the auxiliary heater 25 until a mixture of vapor and air is supplied to the combustion chamber and the engine is started after which the heat from the exhaust pipe 2 is utilized for such vaporization. The fuel in the chamber $a$ is heated to such an extent that the vapor therefrom is visible and has the appearance of smoke. The hot vapor is then introduced into the mixing chamber 14 from whence it is conducted to the intake points of the engine manifold 22, where it is mixed with the cool air supplied through the usual air inlet 15. The mixture is then introduced into the cylinder of the internal combustion motor at low temperature so as to require less of the mixture to produce a greater pressure in a predetermined space within the engine, than would be produced if the mixture were introduced at a high temperature; the principle being that both components of the mixture must reach the same temperature at the instant the mixture is fired, and the mixture containing the cooler air when introduced to the cylinder will expand to a greater volume than a like quantity of a hotter mixture; since both mixtures expand in the same proportion as the raise in temperature and the expansion of the mixture introduced at the lower temperature is greater than that introduced at the higher temperature; there being a greater range of expansion for the colder mixture than for the hotter mixture.

While it is recognized that a carbureter atomizes fuel and introduces the fuel into the cylinders at a low temperature, and introduces the air into said cylinders at a high temperature, the operation of this invention differs therefrom in that with present carbureters the fuel passing into the engine through the carbureter supplying the cold fuel is not vaporized, but is in small globules, and around each of such globules is an air space that is saturated or has a content of fuel vapor, and when such a mixture is fired it reaches a very high temperature, and such high temperature is likely to crack the fuel making a very volatile gas such as is manufactured by domestic gas works; and in such operation a small portion of carbon, that is unburned fuel, is left behind to collect on the walls of the cylinder by virtue of the oil on the walls. On the contrary with this invention the fuel is thoroughly vaporized before it is mixed with the atmospheric air and the mixture is more perfect and all of it burns, thus giving more efficiency and no deposit of carbon.

Where there is vapor saturated air space around the globules of liquid fuel as above indicated, the combustion results in intense heat in spots. With this device the vapor burns more readily than the merely atomized fuel or other cold mixture fuel supplying devices, and is more easily oxidizable, thus giving an assurance of an easily ignited mixture, which may be accomplished with fuel vapor more readily than with merely atomized fuel.

The initial heater 25 may be operated from a common storage battery, and its purpose is to make the starting easy on cold or damp days.

By means of this device low grade liquid fuels may be changed into a combustible vapor that burns readily, thus making available, liquid fuels which would otherwise be impossible with the cold air introduction above referred to.

By highly heating the liquid fuel and producing therefrom a highly heated hydrocarbon vapor and then mixing such vapor with cold air I avoid the accummulation of liquid in the cylinders which would be likely to wash the lubricant from the walls of the cylinders which occurs to a greater or lesser extent when liquid fuels are introduced to the combustion chamber in the merely atomized form and which has heretofore been the cause of injury to such walls and the pistons.

It is well known that liquids thus accumulated in the cylinders work past the pistons in the crank case and destroy the lubricating virtue of the oil, thus causing injury to the bearings.

By first vaporizing the fuel and then mixing it with cold air I avoid this difficulty.

By the construction and arrangement shown I have made provision whereby the amount and the proportions of liquid fuel and air are regulated automatically by the heat of exhaust, that is to say, the amount of cold air taken in is invariable for each stroke of the engine; but as the engine speeds up, the exhaust pipe becomes more highly heated and more greatly attenuates the vapor and increases its volume in the chamber a per unit of fluid admitted thereto thus decreasing the amount of fuel which enters the lower end of the chamber for each stroke of the engine pistons.

By the simultaneous valve control of the vapor in the first instance, and the mixture in the second instance, with a constant cross-sectional area for the air, an automatic regulation takes place when the engine is in operation.

It is obvious that the present device is adapted for cracking of the hydrocarbons for the generation of hot vapor from liquid fuel for use in connection with other apparatus requiring a well balanced stable mixture of cold air and hot vapors from liquid hydrocarbons, for instance for steel making, smelting and the like.

Although I have shown my device as fitted to a four cylinder engine I do not wish to limit myself to that style of engine as the device may be adapted to various units of cylinders.

The device may be entirely covered with asbestos b or other heat retaining material in order to conserve heat and to prevent a cold atmosphere from affecting the hot vapor after leaving the heating chamber a. The heat insulation b also prevents the air flowing toward the mixing chamber from being heated by the jacket 1.

The valves 12 and 16 are so connected together that the valve 16 will not be opened until after the valve 12 has been opened a predetermined distance and thus allow the engine to attain a predetermined speed. After the engine has attained a predetermined speed a further opening of the valve 12 will open the valve 16 and allow atmospheric air to mix with the hot vapor and cause a thinner mixture to be passed to the engine and thus produce a thin mixture for high speeds which will have maximum power.

The connecting rod 18 may be lengthened or shortened by means of the adjusting nut 37 in order to assist in obtaining the correct moment of opening of the valve 16 in relation to the opening of the valve 12.

I have found that the heat induced in the chamber a after its walls have been thoroughly heated by the exhaust and the vapor becomes visible like smoke, as heretofore referred to, is such as to give the vapor a temperature of from 450 to 470 degrees F., at which temperature such vapor is cracked or decomposed so as to cause a deposit of carbon in a solid state in the chamber. The vapor at these high temperatures is dry and is not subject to condensation. The dry highly heated gas is uniformly distributed to all the cylinders of the engine at its highest speeds and burns without any deposit of carbon and with a colorless exhaust. Under these conditions, fuel economy is materially increased as compared with ordinary carburetion and with a dilution of the crank case oil which is at least fifty per cent less than that which occurs when a standard carburetor is used.

I claim.

1. The combination with an internal combustion engine, of an upright exhaust pipe with an expansion chamber extending longitudinally thereof and arranged one inside the other, an air inlet conduit leading to the cylinders of the engine, means for conducting a hydrocarbon liquid to the lower end of said chamber, and a conduit leading from the upper end of the chamber to said air inlet conduit, said chamber being open from end to end and having its walls converging downward at an acute angle until the chamber arrives at a relatively small cross sectional area at its extreme lower end as compared with that at its upper portion.

2. The combination with an internal combustion engine, of an upright exhaust pipe with an expansion chamber extending longitudinally thereof and arranged one inside the other, an air inlet conduit leading to the cylinders of the engine, means for conducting a hydrocarbon liquid to the lower end of said chamber, and a conduit leading from the upper end of the chamber to said air inlet conduit, said chamber being open from end to end and having at its upper portion a cross sectional area at least equal to that of the exhaust pipe and having its walls converging at an acute angle from such upper portion downward until the chamber arrives at a relatively small cross sectional area at its extreme lower end as compared with that at the level at which the walls begin to converge.

3. The combination with an internal combustion engine, of an upright exhaust pipe with a superheating chamber extending along and surrounding the exhaust pipe, an air inlet conduit leading to the cylinders of the engine, means for conducting a hydrocarbon liquid to the extreme lower end of said chamber, and a conduit leading from the upper end of the chamber to said air inlet conduit, said chamber being open from end to end and having its walls converging at an acute angle from the upper portion of the chamber downward until they meet the walls of the exhaust pipe.

4. The combination with an internal combustion engine, of an upright exhaust pipe, with a superheating chamber extending along and surrounding the exhaust pipe, an air inlet conduit leading to the cylinders of the engine, means for conducting a hydrocarbon liquid to the extreme lower end of said chamber, and a conduit leading from the upper end of the chamber to said air inlet conduit, said chamber being open from end to end and having its walls converging at an acute angle from the upper portion of the chamber downward until they meet the walls of the exhaust pipe, and having a horizontal cross section at its upper end which is at least equal to the horizontal cross section of the exhaust pipe.

In testimony whereof, I have hereunto set my hand at Los Angeles, California, this 21st day of June, 1922.

JOHN MILES BARTLEY.